US010105878B2

(12) United States Patent
Usui et al.

(10) Patent No.: US 10,105,878 B2
(45) Date of Patent: Oct. 23, 2018

(54) COMPOSITE-MATERIAL MOLDING METHOD AND MOLDING DEVICE (71) Applicant: Nissan Motor Co., Ltd., Yokohama-shi, Kanagawa (JP)

(72) Inventors: Katsuhiro Usui, Kanagaawa (JP); Naoki Arai, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 68 days.

(21) Appl. No.: 15/516,761

(22) PCT Filed: Oct. 22, 2014

(86) PCT No.: PCT/JP2014/078143
§ 371 (c)(1),
(2) Date: Apr. 4, 2017

(87) PCT Pub. No.: WO2016/063388
PCT Pub. Date: Apr. 28, 2016

(65) Prior Publication Data
US 2017/0297235 A1    Oct. 19, 2017

(51) Int. Cl.
| | | |
|---|---|---|
| *B29C 70/48* | (2006.01) | |
| *B29C 39/42* | (2006.01) | |
| *B29C 39/10* | (2006.01) | |
| *B29C 39/24* | (2006.01) | |
| *B29C 39/44* | (2006.01) | |
| *B29C 45/00* | (2006.01) | |
| *B29C 67/24* | (2006.01) | |

(52) U.S. Cl.
CPC .............. *B29C 39/42* (2013.01); *B29C 39/10* (2013.01); *B29C 39/24* (2013.01); *B29C 39/44* (2013.01); *B29C 45/0005* (2013.01); *B29C 67/246* (2013.01); *B29C 70/48* (2013.01); *B29C 2791/002* (2013.01); *B29C 2791/006* (2013.01)

(58) Field of Classification Search
CPC ................ B29C 70/48; B29C 45/0005; B29C 2791/006
See application file for complete search history.

(56) References Cited

FOREIGN PATENT DOCUMENTS

| | | |
|---|---|---|
| CN | 1799823 A | 7/2006 |
| CN | 100368185 C | 2/2008 |
| CN | 101612783 A | 12/2009 |
| CN | 103231486 A | 8/2013 |
| JP | 52-146475 A | 12/1977 |
| JP | 3-121818 A | 5/1991 |
| JP | 11-48351 A | 2/1999 |
| JP | 2005-169787 A | 6/2005 |

(Continued)

*Primary Examiner* — Jill L Heitbrink
(74) *Attorney, Agent, or Firm* — Global IP Counselors, LLP (57) ABSTRACT

A composite material molding method is provided for forming a composite material. The molding includes disposing carbon fiber in a cavity inside an openable and closable mold, injecting resin into the cavity in a state in which a clamping pressure is exerted on the mold and curing the resin. When a threshold value of the pressure inside the cavity is set to a pressure that is lower than the clamping pressure and the resin is injected into the cavity while exerting an injection pressure that is equal to or greater than the clamping pressure on the resin until the pressure inside the cavity reaches the threshold value. Then, after the pressure inside the cavity has reached the threshold value, the inside of the cavity is suctioned.

12 Claims, 11 Drawing Sheets

(56) References Cited

FOREIGN PATENT DOCUMENTS

| | | | |
|---|---|---|---|
| JP | 2005-193587 | A | 7/2005 |
| JP | 2007-7910 | A | 1/2007 |
| JP | 2007-230175 | A | 9/2007 |
| JP | 2008-302498 | A | 12/2008 |
| JP | 2010-120271 | A | 6/2010 |

FIG. 11B

COMPOSITE-MATERIAL MOLDING METHOD AND MOLDING DEVICE

CROSS-REFERENCE TO RELATED APPLICATIONS

This application is a U.S. National stage application of International Application No. PCT/JP2014/078143, filed Oct. 22, 2014.

BACKGROUND

Field of the Invention

The present invention relates to a composite material molding method and a molding device.

Background Information

In recent years, composite materials made by impregnating a reinforcing base material with resin have been used as automobile parts to reduce the body weight of automobiles. For example, Japanese Laid Open Patent Application No. 2005-193587 discloses a composite material made by impregnating a reinforcing base material with resin. The RTM (Resin Transfer Molding) method, which is suitable for mass production, is attracting attention as a molding method for composite materials. The RTM method is a composite material molding method in which a reinforcing base material is disposed in a cavity inside a mold comprising a lower die (female mold) and an upper die (male mold), which can be opened and closed, resin is injected from a resin injection port to impregnate the reinforcing base material after closing and fastening the dies, after which the resin is cured inside the cavity.

SUMMARY

When injecting resin into the cavity, it is possible to shorten the molding time by increasing the injection pressure of the resin. On the other hand, if the injection pressure of the resin is increased, the pressure inside the cavity will accordingly increase. If the pressure inside the cavity exceeds the clamping pressure that is exerted on the mold, the dies may be opened. If the mold is opened during molding, burrs occur in the molded article, causing defective molding. Consequently, it is necessary to carry out mold clamping by exerting a high clamping pressure with a pressing machine, creating the problems that the pressing machine becomes larger and the equipment cost is accordingly increased.

The present invention was made in order to solve the problems described above, and an object of the present invention is to provide a composite material molding method and molding device that are capable of shortening the molding time and suppressing the clamping pressure to thereby miniaturize the pressing machine.

One aspect of the present invention for achieving the object described above provides a molding method for forming a composite material by disposing a reinforcing base material in a cavity inside an openable and closable mold, injecting resin into the cavity in a state in which a clamping pressure is exerted on the mold, and curing the resin. In the molding method, when the threshold value of the pressure inside the cavity is set lower than the clamping pressure and the resin is injected into the cavity, the resin is injected with an injection pressure that is equal to or greater than the clamping pressure until the pressure inside the cavity reaches the threshold value, and the inside of the cavity is suctioned after the pressure inside the cavity has reached the threshold value.

Another aspect of the present invention for achieving the object described above provides a composite material molding device comprising an openable and closable mold in which is formed a cavity for disposing a reinforcing base material therein, a pressing part that exerts clamping pressure on the mold, a resin injection unit that injects resin into the cavity, and a suction unit that suctions the inside of the cavity. In the molding device, until the pressure inside the cavity reaches a threshold value that is set lower than the clamping pressure, the resin injection unit injects the resin with an injection pressure that is equal to or greater than the clamping pressure, and after the pressure inside the cavity has reached the threshold value, the suction unit suctions the inside of the cavity, and the resin injection unit injects the resin inside the cavity without exerting the injection pressure on the resin.

DETAILED DESCRIPTION OF THE EMBODIMENTS

Embodiments of the present invention will be explained below, with reference to the appended drawings. The description below does not limit the technical scope or the meanings of the terms described in the claims. The dimensional ratios in the drawings are exaggerated for convenience of explanation, and are different from the actual ratios.

Figure 1:
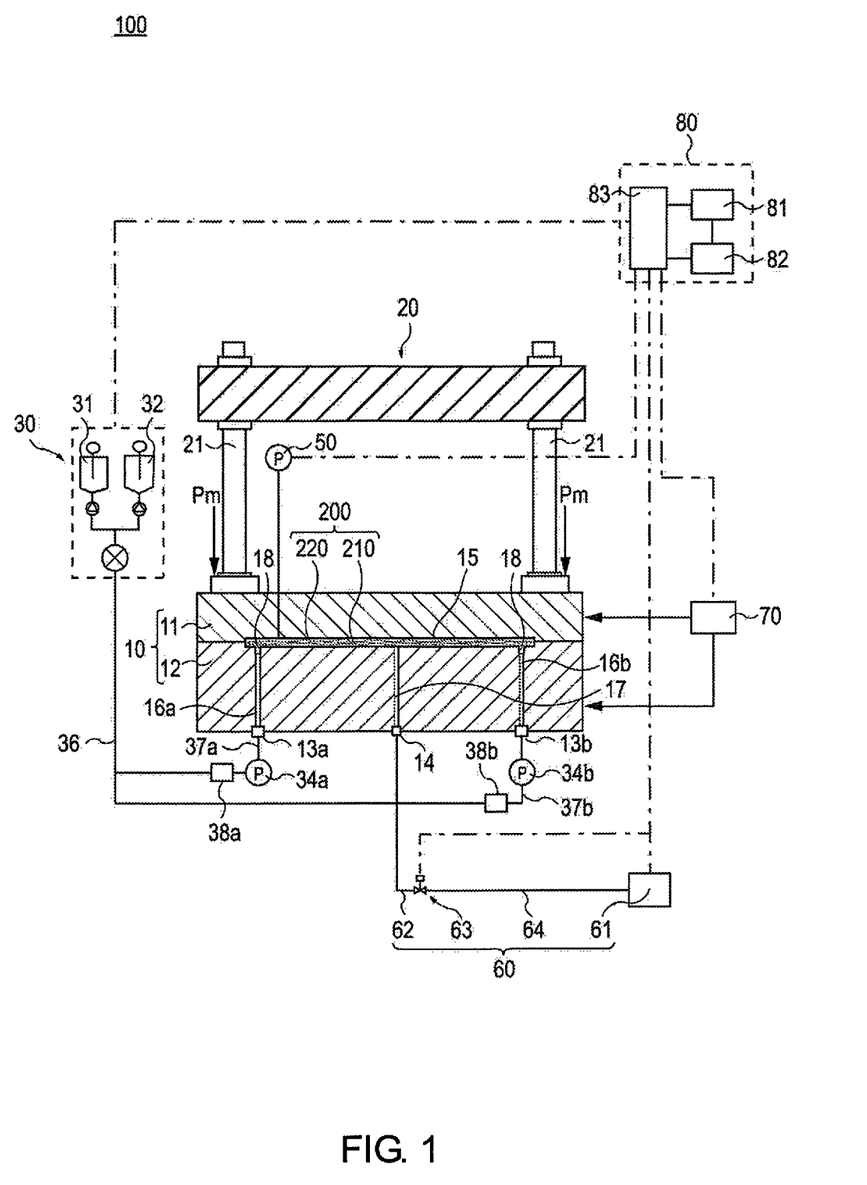
FIG. 1 is a schematic view of the composite material molding device according to the present embodiment.
Figure 2:
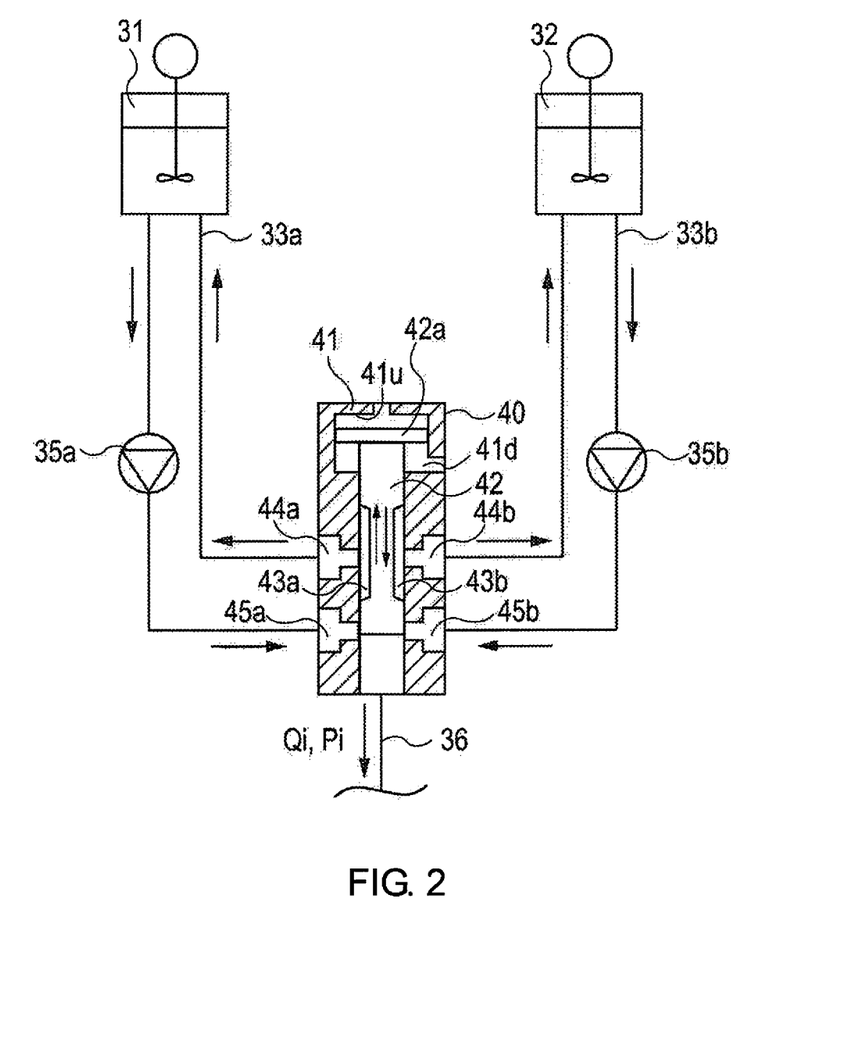
FIG. 2 is a schematic view illustrating the configuration of the resin injection unit of the molding device.
Figure 3A:
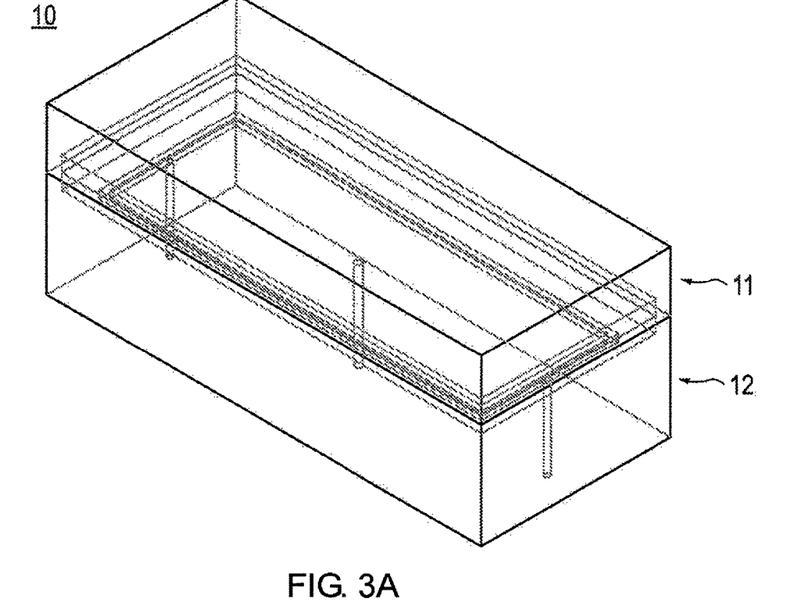
FIG. 3A and FIG. 3B are a perspective view and a plan view of the mold of the molding device.
Figure 3B:
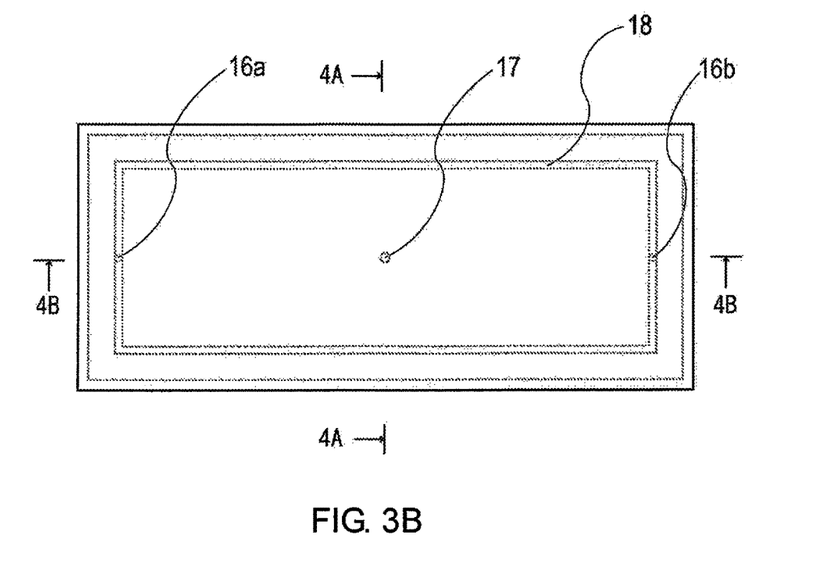
Figure 4A:
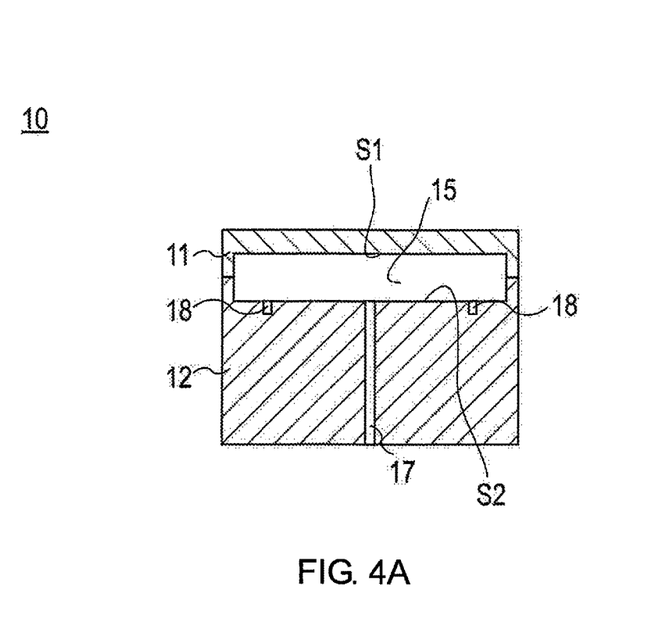
FIG. 4A is a cross-sectional view taken along line 4A-4A in FIG. 3B.
Figure 4B:
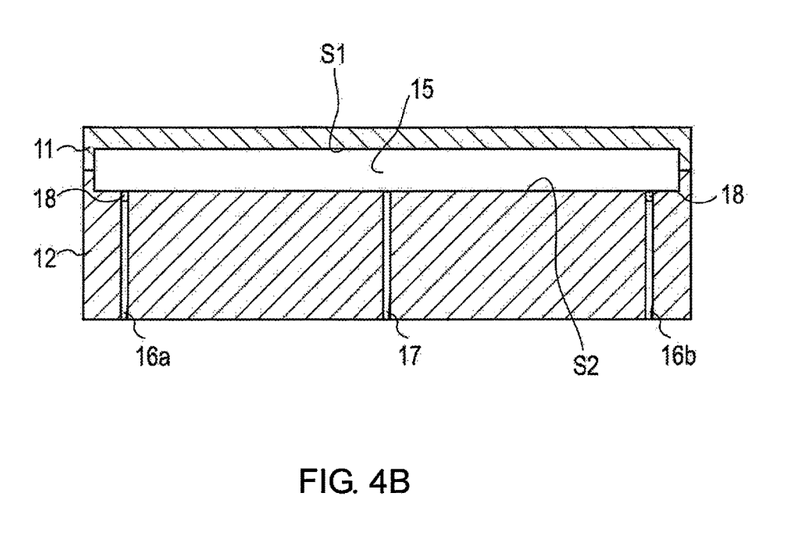
FIG. 4B is a cross-sectional view taken along line 4B-4B in FIG. 3B.
Figure 5A:
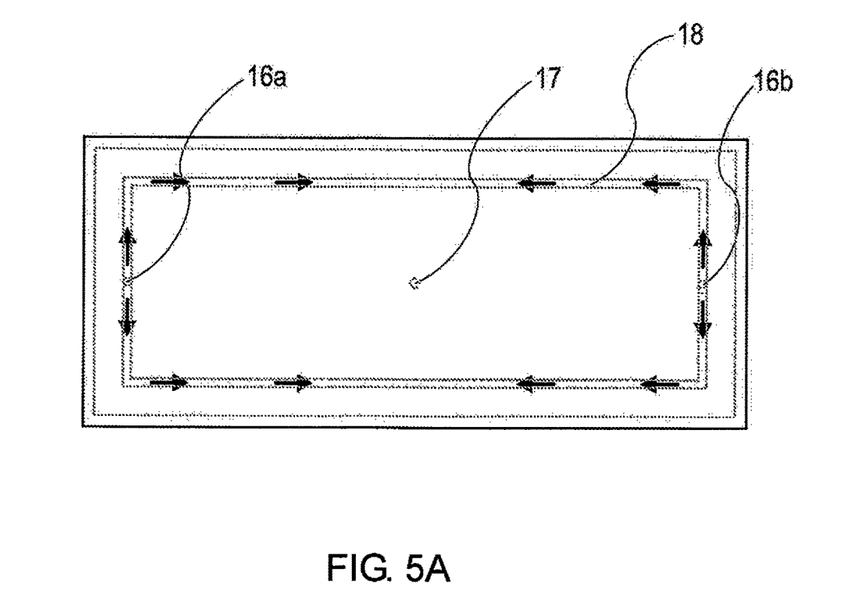
FIG. 5A and FIG. 5B are explanatory diagrams illustrating the action of a line gate of the molding device, and are, respectively, a view illustrating the situation when injecting resin, and a view illustrating the situation when suctioning the inside of the cavity.
Figure 5B:
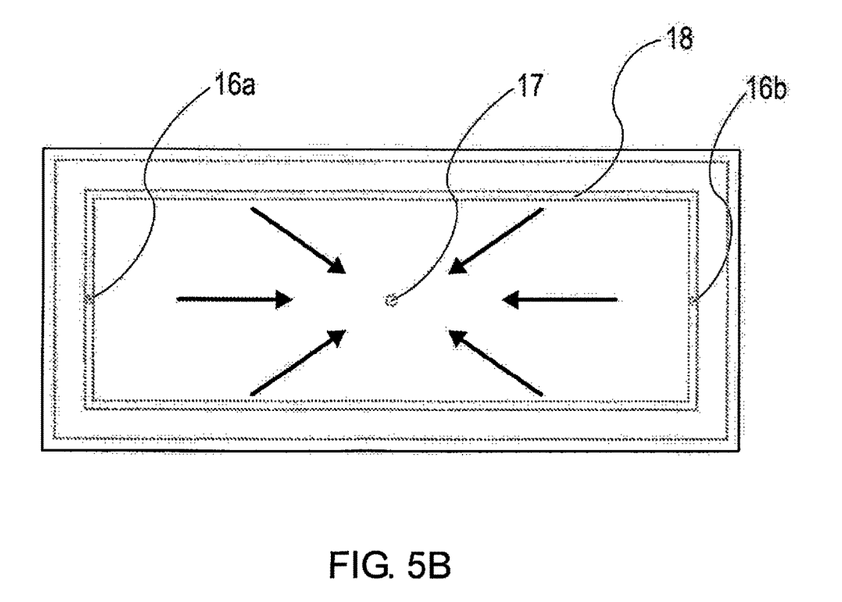
Figure 6A:
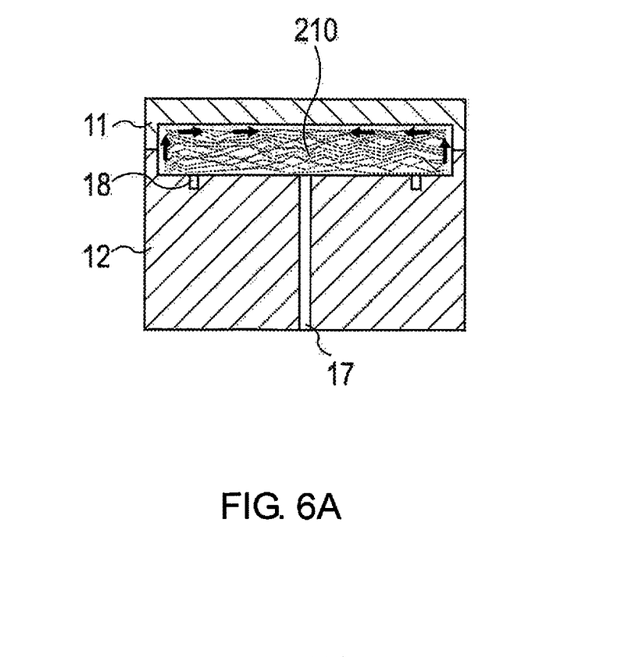
FIG. 6A and FIG. 6B are explanatory diagrams illustrating the situation inside the cavity when injecting resin inside the cavity of the molding device, and are cross-sectional diagrams corresponding to FIG. 4A and FIG. 4B.
Figure 6B:
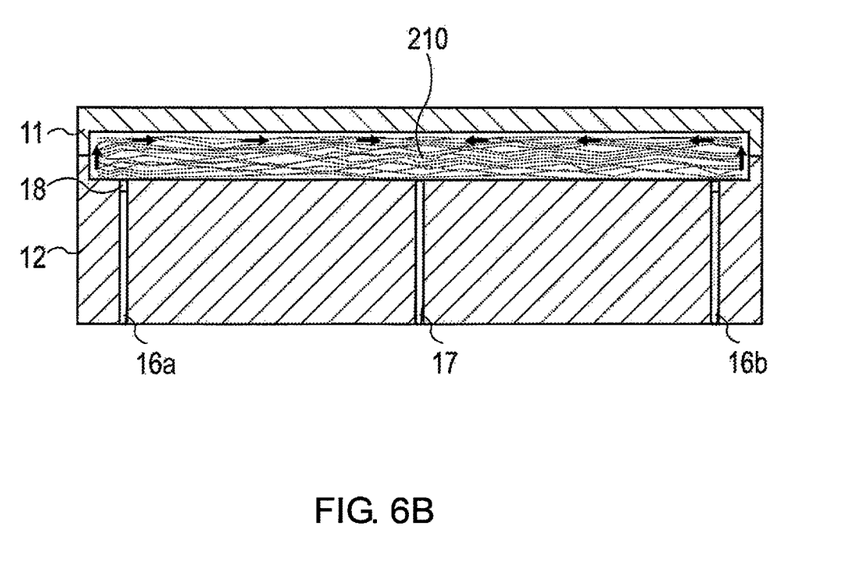
Figure 7:
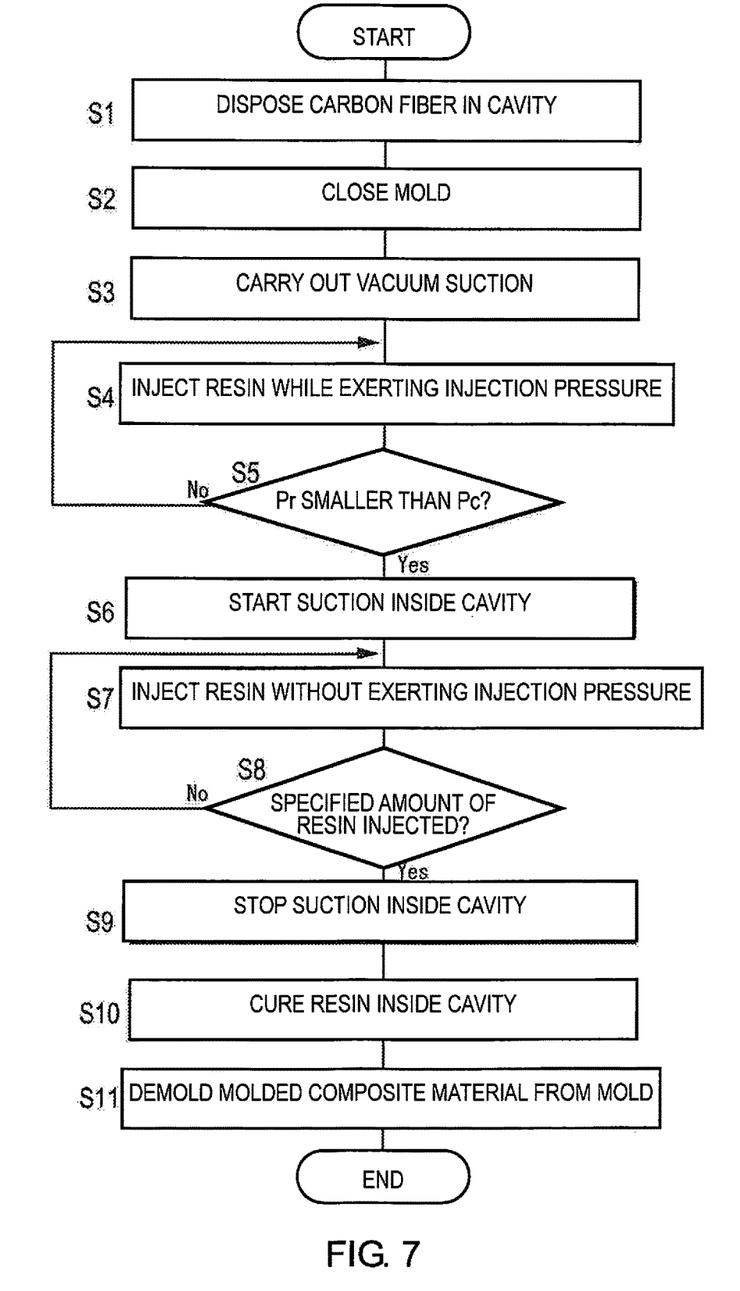
FIG. 7 is a flowchart illustrating the composite material molding method according to the present embodiment.
Figure 8A:
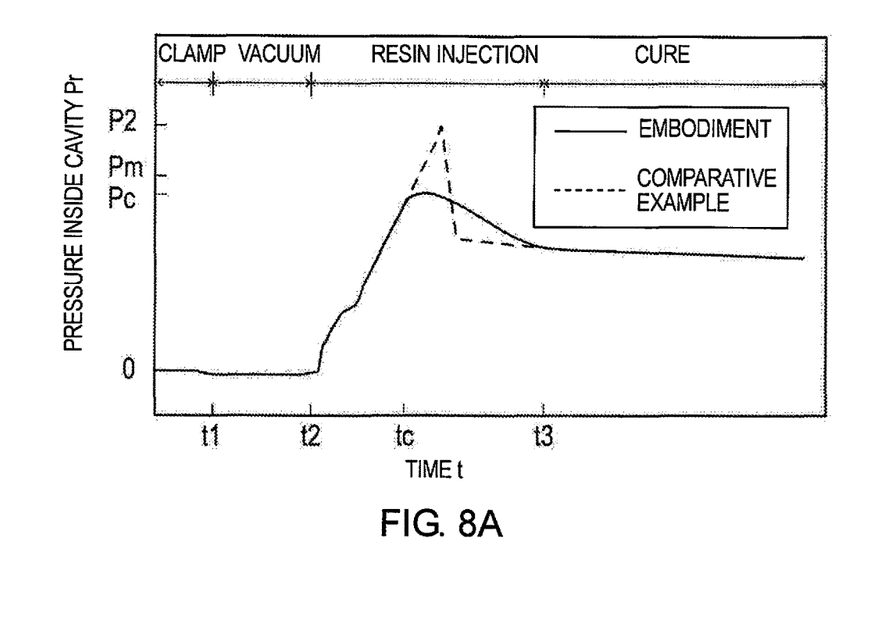
FIG. 8A is a graph representing the temporal transition of the pressure inside the cavity according to the embodiment.
Figure 8B:
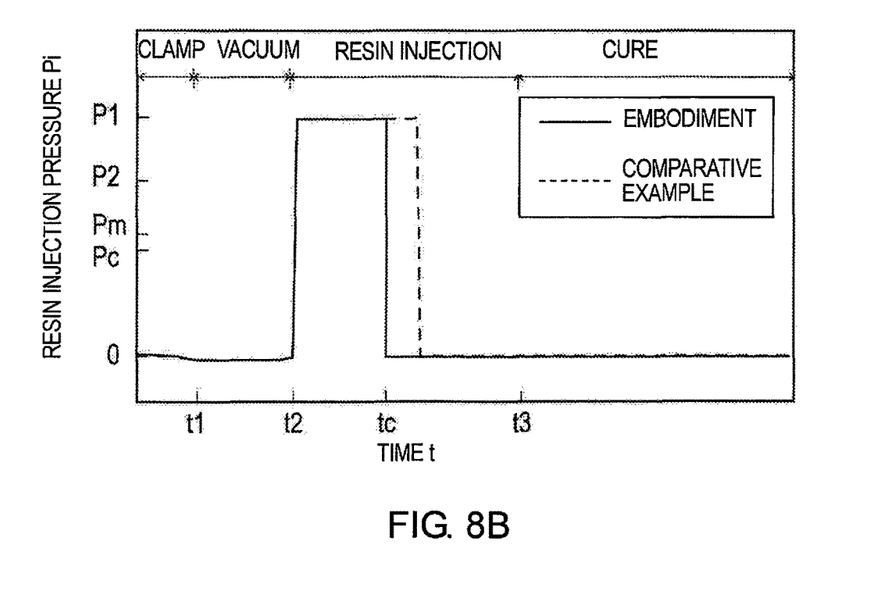
FIG. 8B is a graph representing the temporal transition of the injection pressure of resin according to the embodiment.
Figure 9A:
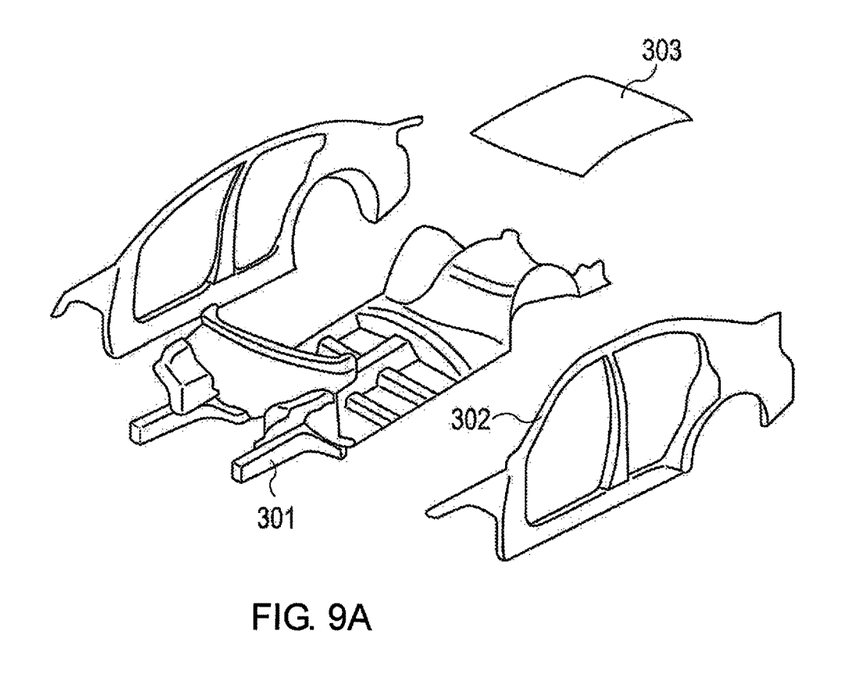
FIG. 9A is an exploded view illustrating automobile parts that use composite material.
Figure 9B:
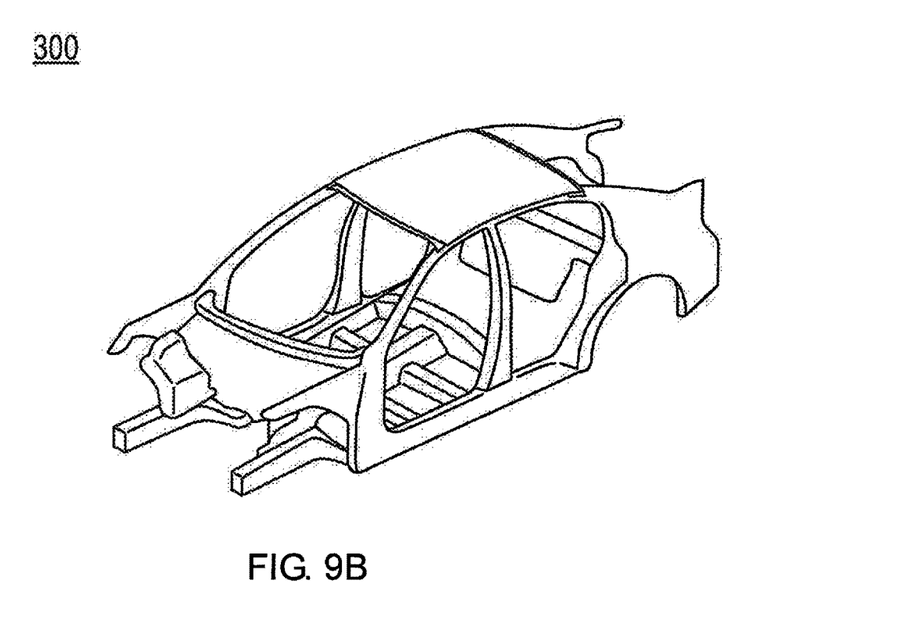
FIG. 9B is a view illustrating a vehicle body in which the parts are joined.

FIG. 1 is a schematic view of the composite material 200 molding device 100. FIG. 2 is a schematic view illustrating the configuration of the resin injection unit 30. FIG. 3A and FIG. 3B are a perspective view and a plan view of the mold 10. FIG. 4A is a cross-sectional view taken along line 4A-4A in FIG. 3B, and FIG. 4B is a cross-sectional view taken along line 4B-4B in FIG. 3B. FIG. 5A and FIG. 5B are explanatory diagrams illustrating the action of the line gate 18, and are, respectively, a diagram illustrating the situation when injecting the resin 220, and a diagram illustrating the situation when suctioning the inside of the cavity 15. In FIG. 5A and FIG. 5B, the reinforcing base material 210 is omitted. FIG. 6A and FIG. 6B are explanatory diagrams illustrating the situation inside the cavity 15 when injecting the resin 220 into the cavity 15, and are cross-sectional views corresponding to FIG. 4A and FIG. 4B. FIG. 7 is a flowchart illustrating the composite material 200 molding method. FIG. 8A is a graph representing the temporal transition of the pressure Pr inside the cavity 15 according to the present embodiment, and FIG. 8B is a graph representing the temporal transition of the injection pressure Pi of resin 220 according to the present embodiment. FIG. 9A is an exploded view illustrating automobile parts 301-303 that use composite material 200, and FIG. 9B is a view illustrating a vehicle body 300 in which the parts are joined.

An embodiment of the present invention will be described below based on the drawings.

The composite material 200 that is obtained by the molding method and the molding device 100 according to the present embodiment is configured by a reinforcing base material 210 and resin 220. By being combined with the reinforcing base material 210, the composite material 200 is provided with higher strength and rigidity compared to the resin 220 alone. In addition, by using the composite material 200 in frame components, such as a front side member 301 and a pillar 302, and in outer panel components, such as a roof 303, which are parts that are used in the vehicle body 300 of an automobile (refer to FIG. 9B), it becomes possible to reduce the weight of the vehicle body compared to the use of steel material, as illustrated in FIG. 9.

The reinforcing base material 210 is formed of textile sheets, such as carbon fibers, glass fibers, and organic fibers, and is preformed by disposing in a cavity 15 formed in the mold 10 in a laminated state. In the present embodiment, carbon fibers are used, which have a small coefficient of thermal expansion, are excellent in dimensional stability, and have little reduction in mechanical properties, even under high temperatures. The preform may be carried out in a mold other than the mold 10.

Epoxy resins, phenol resins, etc., which are thermosetting resins, are used as the resin 220. In the present embodiment, epoxy resin, which has excellent mechanical properties and dimensional stability is used. The mainstream epoxy resin is a two-liquid type, which is used by mixing a main agent and a curing agent. Generally, a bisphenol A type of epoxy resin is used for the main agent and an amine type is used for the curing agent, but no limitation is imposed thereby, and the agents may be appropriately selected according to the desired material properties.

To provide an overview with reference to FIG. 1, the molding device 100 according to the present embodiment comprises an openable and closable mold 10 in which is formed a cavity 15 for disposing carbon fiber 210 (corresponding to a reinforcing base material), a pressing part 20 that exerts clamping pressure Pm on the mold 10, and a resin injection unit 30 that injects the resin 220 into the cavity 15. The molding device 100 further comprises a valve 40 that is provided on the resin injection unit 30 and that can freely adjust the injection pressure Pi of the resin 220, a pressure gauge 50 that measures the pressure Pr inside the cavity 15, a suction unit 60 that draws a vacuum inside the cavity 15, a mold temperature adjustment unit 70 that adjusts the temperature of the mold 10, and a control unit 80 that controls the operation of the entire molding device 100. The mold 100 will be described in detail below.

The mold 10 comprises an upper die 11 (male mold) and a lower die 12 (female mold), which can be opened and closed, injection ports 13a and 13b, a suction opening 14, a cavity 15, flow channels 16a, 16b, 17, and a line gate 18. The carbon fiber 210 is disposed in the cavity 15 in advance, in a laminated and preformed state.

The injection ports 13a and 13b are provided in the lower portion of the lower die 12. The injection ports 13a and 13b are connected to the resin injection unit 30.

The suction opening 14 is provided in the center of the lower portion of the lower die 12. The suction opening 14 is connected to the suction unit 60.

The cavity 15 is formed to be freely sealable by the inner surface S1 of the upper die 11 and the inner surface S2 of the lower die 12, as illustrated in FIG. 4A and FIG. 4B. A sealing member, or the like, may be provided on the mating surfaces of the upper die 11 and the lower die 12, in order to put the inside of the cavity 15 in a sealed state.

The flow channel 16a (16b) is fluidly linked with the injection port 13a (13b). The resin that is injected from the resin injection unit 30 into the injection port 13a (13b) is led inside the cavity 15 through the flow channel 16a (16b).

The flow channel 17 is fluidly linked with the suction opening 14. The inside of the cavity 15 is suctioned by the suction unit 60, via the flow channel 17 and the suction opening 14.

In the present embodiment, the line gate 18, having a rectangular shape, is provided on the inner surface S2 of the lower die 12, as illustrated in FIG. 3 and FIG. 4. By providing the line gate 18 in the mold 10, the resin 220 that is injected from the injection ports 13a and 13b is more easily and efficiently spread inside the cavity 15. The impregnation of the resin 220 into the carbon fiber 210 is thereby promoted. Specifically, with reference to FIG. 5A, the resin 220 that is injected from the injection port 13a (13b) is led to the cavity 15 through the flow channel 16a (16b). The resin 220 that is led inside the cavity 15 spreads along the line gate 18, as indicated by the arrows, and impregnates from the lower surface of the carbon fiber 210. Since the resin impregnates the carbon fiber 210 while spreading along the line gate 18, the impregnation of the resin 220 is achieved efficiently. In addition, when the inside of the line gate 18 is filled by the resin 220, a portion of the resin 220 spreads to the side surface and the upper surface of the carbon fiber 210, passing between the carbon fiber 210, and the upper die 11 and the lower die 12, as indicated by the arrows illustrated in FIG. 6A and FIG. 6B. Then, the resin 220 impregnates the inside from the side surfaces and the upper surface of the carbon fiber 210 as well.

The pressing part 20 exerts clamping pressure Pm on the upper die 11 of the mold 10. The pressing part 20 comprises a cylinder 21 that uses fluid pressure, such as hydraulic pressure, and adjusts the clamping pressure Pm by controlling the hydraulic pressure, etc.

The resin injection unit 30 injects the resin 220 into the cavity 15 while exerting an injection pressure Pi, until the pressure Pr inside the cavity 15 reaches a threshold value Pc. On the other hand, after the pressure Pr inside the cavity 15 reaches the threshold value Pc, the resin 220 is injected in the cavity 15 without exerting the injection pressure Pi.

With reference to FIG. 1 and FIG. 2, the resin injection unit 30 comprises a main agent tank 31, a curing agent tank 32, a plurality of tubes 33a, 33b, 36, 37a and 37b, a pair of pressure gauges 34a and 34b, a pair of pumps 35a and 35b, a pair of buffers 38a and 38b, and an injection valve 40.

A main agent is filled in the main agent tank 31, and a curing agent is filled in the curing agent tank 32.

The pressure gauges 34a and 34b are respectively disposed in the tubes 37a and 37b near the injection ports 13a and 13b, in order to measure the injection pressure Pi of the resin 220.

With reference to FIG. 2, the pumps 35a, 35b are respectively disposed in tubes 33a, 33b, which are connected to the main agent tank 31 and the curing agent tank 32. The pumps 35a, 35b discharge the main agent and the curing agent toward the injection valve 40 at a constant pressure.

The tube 36 connects the buffers 38a, 38b and the injection valve 40 described later, and the tube 37a (37b) connects the buffer 38a (38b) to the injection port 13a (13b). The resin 220 that is discharged from the injection valve 40 goes through the tube 36, the buffer 38a (38b), and the tube 37a (37b) in that order, and is led to the injection port 13a (13b).

The buffer 38a (38b) is connected with the tube 36 and the tube 37a (37b) in a fluidly communicating state. When the resin 220 passes through the buffers 38a, 38b, a set amount of resin 220 is stored inside the buffers 38a, 38b. By a set amount of the resin 220 being stored in the buffers 38a, 38b, the resin 220 is injected into the cavity 15 without exerting the injection pressure Pi, after the pressure Pr inside the cavity 15 reaches the threshold value Pc.

Specifically, when the resin 220 is injected while exerting the injection pressure Pi, the pressure Pr inside the cavity 15 and the pressure inside the buffers 38a, 38b, are substantially the same pressure. Then, after the pressure Pr inside the cavity 15 has reached the threshold value Pc, the inside of the cavity 15 is suctioned by the suction unit 60 described later. By the suction unit 60 suctioning inside the cavity 15, the pressure Pr inside the cavity 15 becomes a pressure that is relatively lower than the pressure inside the buffers 38a, 38b. The resin 220 that has been stored inside the buffers 38a, 38b is injected inside the cavity 15 by the pressure difference, until the pressure difference is eliminated.

The injection valve 40 comprises a cylinder 41 and a piston 42. The cylinder 41 comprises two chambers 41u, 41d, which are partitioned by the proximal end portion 42a of the piston 42. The piston 42 is moved in the vertical direction in the figure by adjusting the fluid pressure, such as air pressure and hydraulic pressure that is supplied to the two chambers 41u, 41d. The opening amount of the flow path of the main agent and the curing agent is adjusted by the piston 42 being moved inside the cylinder 41. The amount Qi of the resin 220 injected into the cavity 15 is adjusted by the opening amount of injection valve 40, to adjust the injection pressure Pi of the resin 220 that is transported to the mold 10. It is known that when the viscosity is 200 (mPa·s) or less in a state before the resin 220 is cured, the injection amount Qi and the injection pressure Pi of the resin 220 into the cavity 15 are in a correlated relationship, represented by the formula $Qi^2 = A \times Pi$ (A is a value determined by the coefficient of discharge, the flow channel area, and the fluid density).

The cylinder 41 comprises an upper side suction port 44, and a lower side discharge port 45. When the piston 42 is moved upward in the figure, the lower side discharge port 45 is opened. The main agent and the curing agent that are ejected from the lower side discharge port 45, are mixed to become the resin 220. The resin 220 is discharged into the injection port 13a (13b), after passing through the tube 36, the buffer 38a (38b), and the tube 37a (37b) in that order. When the piston 42 is moved downward in the figure, the upper side suction port 44 and the lower side discharge port 45 are linked via recess 43 formed in the piston 42. The main agent and the curing agent pass through the recess 43 from the lower side discharge port 45, and are returned from the upper side suction port 44 to the main agent tank 31 and the curing agent tank 32. With this operation, the main agent and the curing agent are circulated in the tube 33 under a constant pressure.

Referring to FIG. 1 again, the pressure gauge 50 comprises a strain gauge, and the like, and is disposed on the mold 10 for measuring the pressure Pr inside the cavity 15.

The suction unit 60 suctions inside the cavity 15. Specifically, the suction unit 60 suctions the air inside the cavity and a portion of the resin 220 that is injected into the cavity 15. More specifically, when suctioning the inside of the cavity 15, the suction unit 60 gradually lowers the pressure Pr inside the cavity 15.

With reference to FIG. 1, the suction unit 60 comprises a pump 61, piping 62 and 64, and a suction valve 63. The pump 61 is a vacuum pump capable of mixing and transporting gas and liquid. The suction valve 63 is used for the starting and stopping operation of the suctioning of the inside of the cavity 15, and for the adjustment of the suction pressure. By operating the suction valve 63, it is possible to suction the inside of the cavity 15 such that the pressure Pr inside the cavity 15 is gradually lowered. In the present embodiment, the suction valve 63 is operated by the control unit 80, described later. By opening the suction valve 63 in a state in which the pump 61 is operated, the air inside the cavity 15 and a portion of the resin 220 that is injected into the cavity 15 is suctioned by the pump 61 via the piping 62 and 64.

By the suction unit 60 suctioning a portion of the resin 220 that is injected into the cavity 15, an injection space for the resin 220 is secured inside the cavity 15. Accordingly, it becomes easy to inject the resin 220 into the cavity 15 without exerting the injection pressure Pi.

Specifically, by the suction unit 60 suctioning a portion of the resin 220, a flow of the resin 220 is generated in the cavity 15, as illustrated by the arrows in FIG. 5B. By the flow of resin 220 occurring, the resin 220 is dispersed inside the cavity 15. Accordingly, it becomes possible to cause the resin 220 to reach places that are difficult to reach, unless injection is carried out while exerting a high injection pressure Pi, without exerting the injection pressure Pi. The flow of the resin 220 is more easily generated when a large portion of the inside of the cavity 15 is filled with the resin 220.

The mold temperature adjustment unit 70 comprises a heating member and heats the mold 10 to the curing temperature of the resin 220, to cure the resin 220 that is injected inside the cavity 15. The heating member is an electric heater, and directly heats the mold 10. The heating member is not limited thereto; for example, a thermal catalyst, such as oil may be heated by an electric heater, and the thermal catalyst may be circulated inside the mold 10 in order to adjust the temperature of the mold 10.

The control unit 80 controls the operation of the entire molding device 100. The control unit 80 comprises a storage unit 81, a calculation unit 82, and an input/output unit 83. The input/output unit 83 is connected to the pressure gauges 34a, 34b and 50, the injection valve 40, the suction unit 60, and the mold temperature adjustment unit 70. The storage unit 81 is configured with a ROM and RAM, and stores data in advance, such as the threshold value Pc of the pressure Pr inside the cavity 15. The calculation unit 82 is configured mainly by a CPU, and receives data on the injection pressure Pi of the resin 220 and on the pressure Pr inside the cavity 15 from the pressure gauges 34a, 34b and 50, via the input/output unit 83. The calculation unit 82 calculates the piston 42 position of the injection valve 40, the suction pressure of the suction unit 60, and the heating temperature of the mold 10 by the mold temperature adjustment unit 70, based on data read from the storage unit 81 and the data received from the input/output unit 83. Control signals based on the calculated data are transmitted to the injection valve 40, the suction unit 60, and the mold temperature adjustment unit 70, via the input/output unit 83. In this manner, the control unit 80 controls the injection pressure Pi of the resin 220, the pressure Pr inside the cavity 15 for the vacuum, and the molding temperature, etc.

In addition, the control unit 80 controls the suction timing of the suction unit 60. Specifically, the control unit 80 controls the suction unit 60 to carry out suctioning of the inside of the cavity 15 before injecting the resin 220. Furthermore, after the pressure Pr inside the cavity 15 has reached the threshold value Pc, the control unit 80 controls the suction unit 60 so as to suction the inside of the cavity 15. At this time, the control unit 80 controls the suction unit 60 such that the pressure Pr inside the cavity 15 is gradually lowered. Whether or not the pressure Pr inside the cavity 15 has reached the threshold value Pc is determined based on the measured values of the pressure gauge 50.

The procedure of the composite material 200 molding method will be described below, with reference to FIG. 7.

The composite material 200 molding method comprises a step of disposing the carbon fiber 210 (Step S1), a step of closing the mold 10 (Step S2), a step of carrying out vacuum suction (Step S3), steps of injecting the resin 220 (Steps S4-S9), a step of curing the resin 220 (Step S10), and a demolding step (Step S11), as illustrated in FIG. 7. Each step will be described in detail below. Excluding the operations of Steps S1, S10, and S11, the control unit 80 executes the process of each step.

First, carbon fibers 210 are laminated, preformed, and disposed inside the cavity 15 of the mold 10 (Step S1). At this time, the inner surface of the mold that faces the cavity 15 is degreased using a predetermined organic solvent, and a mold releasing treatment is administered using a mold releasing agent.

Next, the mold 10 is closed (Step S2). In the present embodiment, the upper die 11 and the lower die 12 of the mold 10 approach, and closing of the mold proceeds by exerting a clamping pressure Pm on the mold 10 by a pressing part 20. When the upper die 11 and the lower die 12 of the mold 10 come into contact, closing of the mold 10 is completed. At this time, a sealed cavity 15 is formed between the upper die 11 and the lower die 12.

Next, air is suctioned from the suction opening 14 by the suction unit 60 to create a vacuum, and the inside of the cavity 15 is put in a vacuum state (Step S3). At this time, the pressure is adjusted by the control unit 80 based on the data of the pressure gauge 50 so as to be a negative pressure. By carrying out the vacuum, it is possible to prevent air bubbles from being generated on the surface, to reduce voids and pits in the composite material 200, which is a molded article, and to improve the mechanical properties and the design of the composite material 200.

Next, the injection pressure Pi of the resin 220 is adjusted to be a first pressure P1 (refer to FIG. 8B) that is higher than the clamping pressure Pm, to start the injection of the resin 220 from the injection ports 13a and 13b (Step S4). The resin 220 is discharged from the injection valve 40, and injected inside of the cavity 15 through the buffers 38a, 38b. At this time, the buffers 38a, 38b store a set amount of the resin 220. The resin 220 that is injected inside of the cavity 15 spreads inside of the cavity 15 via the line gate 18 to impregnate the carbon fiber 210, as described above with reference to FIG. 5A, FIG. 6A, and FIG. 6B.

After starting the injection of the resin 220, the pressure Pr inside the cavity 15 is measured by the pressure gauge 50 within a predetermined time (Step S5). The resin 220 is injected by exerting the injection pressure Pi, and the measuring of the pressure Pr inside the cavity 15 is continued until the pressure Pr inside the cavity 15 reaches a threshold value Pc (Step S5: "No," Step S4). When the pressure Pr inside the cavity 15 reaches the threshold value Pc (Step S5: "Yes"), the exerting of the injection pressure Pi on the resin 220 is stopped. At this time, the pressure Pr inside the cavity 15 and the pressure inside the buffers 38a, 38b are substantially equal.

Next, the suctioning inside of the cavity 15 is started by the suction unit 60 (Step S6). By the suction unit 60 suctioning inside the cavity 15, the pressure Pr inside the cavity 15 becomes a pressure that is relatively lower than the pressure inside the buffers 38a, 38b. The resin 220 that has been stored inside the buffers 38a, 38b is injected into the cavity 15 by the pressure difference, until the pressure difference is eliminated. Accordingly, the resin 220 is injected into the cavity 15 without exerting the injection pressure Pi (Step S7). The suction inside of the cavity 15 is carried out such that the pressure Pr inside the cavity 15 is gradually lowered.

The operation of Step S7 is repeated until the resin 220 completely fills the inside of the cavity 15 (Step S8: "No," Step S7).

When the injection of a specified amount of the resin 220 inside the cavity 15 is ended (Step S8: "Yes"), the suction of the inside of the cavity 15 is stopped (Step S9).

Next, it is left to stand until the resin 220 inside the cavity 15 is sufficiently cured (Step S10). The temperature of the entire mold 10 is adjusted in advance to the curing temperature of the resin 220, by the mold temperature adjustment unit 70.

When the mold 10 is opened and the molded composite material 200 is demolded, the molding is complete (Step S11).

Next, with reference to FIGS. 8A and 8B, the action and effect of the molding device and molding method according to the present embodiment will be described in detail.

The graphs illustrated by the solid lines in FIGS. 8A and 8B illustrate the temporal transition of the pressure Pr inside the cavity 15 and the injection pressure Pi of the resin 220 according to the molding device and the molding method of the present embodiment illustrated in FIG. 1 and FIG. 7. The graph illustrated by the dashed line is a comparative example, and illustrates the temporal transition of the pressure Pr inside the cavity 15 and the injection pressure Pi of the resin 220, when an injection pressure P1 that exceeds the clamping pressure Pm is constantly exerted until the injection is completed to inject the resin 220 inside of the cavity

15. The molding device and the molding method according to the comparative example is the same as the molding device and the molding method according to the present embodiment, excluding the point that an injection pressure P1 that exceeds the clamping pressure Pm is constantly exerted until the injection is completed to inject the resin 220 inside of the cavity 15.

Time 0 (sec)-t1 is the clamping step, time t1-t2 is the vacuum step, time t2-t3 is the injection step of the resin 220, and t3 onward is the curing step of the resin 220. Here, after injecting the resin 220 at the injection pressure Pi, the pressure Pr inside the cavity 15 will not immediately increase, but will gradually increase with a delay from the injection pressure Pi, as illustrated in FIGS. 8A and 8B.

If the injection pressure Pi is constantly exerted to inject the resin 220 inside of the cavity 15, as in the comparative example illustrated by the dashed line in FIG. 8A, the molding time and the clamping pressure are in a trade-off relationship. Specifically, it is necessary to increase the clamping pressure in order to shorten the time required for the injection step, and the time required for the injection step must be long in order to decrease the clamping pressure.

More specifically, it is necessary to increase the injection amount Qi when injecting the resin 220 inside of the cavity 15, in order to shorten the time required for the injection step. Then, it is necessary to increase the injection pressure Pi, in order to increase the injection amount Qi. As described above, the pressure Pr inside the cavity 15 will gradually increase with a delay from the injection pressure Pi. When the inside of the cavity 15 is substantially filled by the resin 220, the pressure Pr inside the cavity 15 takes the maximum value. As this time, to ensure that the mold 10 does not open, it is necessary to apply a clamping pressure to the mold 10 that is greater than the maximum value of the pressure Pr inside the cavity 15.

Here, the maximum value of the pressure Pr inside the cavity 15 becomes greater as the injection pressure Pi is increased. Accordingly, if the injection pressure Pi is increased, it is necessary to apply a greater clamping pressure to the mold 10. For example, in the case of the comparative example, the maximum value of the pressure Pr inside the cavity 15 is P2, as illustrated in FIG. 8A. Since P2 is higher than the clamping pressure Pm of the present embodiment, a clamping pressure that is greater than the clamping pressure Pm of the present embodiment must be exerted to ensure that the mold 10 does not open in the comparative example.

Conversely, it is necessary to decrease the maximum value of the pressure Pr inside the cavity 15 in the injection step in order to reduce the clamping pressure. Since the maximum value of the pressure Pr inside the cavity 15 becomes higher as the injection pressure Pi is increased, it is necessary to reduce the injection pressure Pi in order to decrease the maximum value of the pressure Pr inside the cavity 15. Since the injection amount Qi is reduced if the injection pressure Pi is decreased, the time required for the injection step is increased.

On the other hand, in the present embodiment, the resin 220 is injected into the cavity 15 while exerting an injection pressure Pi on the resin 220 that is equal to or greater than the clamping pressure, until the pressure Pr inside the cavity 15 reaches a threshold value Pc. In the example illustrated in FIG. 8B, since the injection pressure Pi in the present embodiment=P1, the injection amount Qi during time t2-tc is the same as the comparative example case. Then, after the pressure Pr inside the cavity 15 reaches the threshold value Pc, the resin 220 is injected without exerting the injection pressure Pi, by suctioning the inside of the cavity 15. The resin 220 can thereby be injected such that the same injection amount Qi as when the injection pressure Pi that is equal to or greater than the clamping pressure Pm is exerted until the injection of the resin 220 is completed, is maintained.

In the example illustrated in FIGS. 8A and 8B, the resin 220 can be injected in the same injection amount as in the comparative example, in which the injection pressure P1 equal to or greater than the clamping pressure Pm is exerted until the injection of the resin 220 is completed, is maintained. At this time, the pressure Pr inside of the cavity 15 does not exceed the clamping pressure Pm. As described above, the clamping pressure Pm in the present embodiment is lower than the clamping pressure required in the case of the comparative example. Therefore, in the molding device and the molding method according to the present embodiment, it is possible to reduce the clamping pressure while maintaining the same injection amount as in the case of the comparative example. Accordingly, in the molding device and molding method according to the present embodiment, it is possible to simultaneously achieve a reduction in the molding time and a suppression in the clamping pressure Pm. The suppression of the clamping pressure Pm makes miniaturization of the pressing machine possible, and contributes to a reduction in equipment cost.

The threshold value Pc is set in advance, based on the material characteristics, the injection amount, and the injection speed, etc., of the resin 220. In the present embodiment, the threshold value Pc is set to 90% of the clamping pressure Pm. Giving consideration to errors in the pressure measurements, for example, the threshold value Pc may be selected from values in the range of 85%-95% of the clamping pressure Pm. Since the threshold value Pc is set immediately before reaching the clamping pressure Pm, it is possible to inject the resin 220 while exerting an injection pressure Pi that exceeds the clamping pressure Pm, until immediately before the pressure Pr inside the cavity 15 reaches the clamping pressure Pm.

By setting the threshold value Pc to a high value, the pressure Pr inside the cavity 15 in the injection step is also increased. By the pressure Pr inside the cavity 15 becoming high, it is possible to improve the impregnating ability of the resin 220 into the carbon fiber 210. However, it is preferable to set the threshold value Pc such that an overshoot does not occur, in which the pressure Pr inside the cavity 15 exceeds the clamping pressure Pm, in an operation to stop the exertion of the injection pressure Pi to the resin 220.

In addition, the pressure inside the cavity 15 when 90% of the total injection amount of the resin 220 has been injected inside of the cavity 15 may be selected as the threshold value Pc. At this time, giving consideration to errors in the pressure measurements, the pressure inside the cavity 15 when 85%-95% of the total injection amount of the resin 220 has been injected inside of the cavity 15 may be selected as the threshold value Pc. As described above with reference to FIG. 5B, by suctioning the inside of the cavity 15 in a state in which a large portion inside of the cavity 15 is filled with the resin 220, flow of the resin 220 is more easily generated inside of the cavity 15. Accordingly, it becomes easy for the resin 220 to spread inside of the cavity 15 without exerting the injection pressure Pi on the resin 220.

The suction unit 60 gradually lowers the pressure Pr inside the cavity 15 when suctioning the inside of the cavity 15 after the pressure Pr inside the cavity 15 has reached the threshold value Pc, as illustrated in FIG. 8A. It is thereby possible to reduce the contraction rate of the resin 220 at the time of curing. Accordingly, it is possible to decrease the mold contraction rate of the composite material 200, which is the molded article, and to stably obtain the shape according to the design.

As described above, in the molding device 100 and the molding method according to the present embodiment, the threshold value Pc of the pressure Pr inside the cavity 15 is set to be equal to or less than the clamping pressure Pm. Then, when injecting the resin 220 inside of the cavity 15, the resin 220 is injected while exerting an injection pressure Pi that is equal to or greater than the clamping pressure Pm, until the pressure Pr inside the cavity 15 reaches a threshold value Pc. Furthermore, after the pressure Pr inside the cavity 15 reaches the threshold value Pc, the resin 220 is injected without exerting the injection pressure Pi, by suctioning the inside of the cavity 15.

According to the molding device 100 configured in this manner and the molding method that uses the molding device 100, the resin 220 can be injected into the cavity 15 while exerting an injection pressure Pi on the resin 220 that is equal to or greater than the clamping pressure Pm, until the pressure Pr inside the cavity 15 reaches a threshold value Pc. Then, after the pressure Pr inside the cavity 15 reaches the threshold value Pc, the resin 220 is injected without exerting the injection pressure N, by suctioning the inside of the cavity 15. The resin 220 can thereby be injected in the same injection amount Qi as when an injection pressure Pi that is equal to or greater than the clamping pressure Pm is exerted until the injection of the resin 220 is completed, without the pressure Pr inside the cavity 15 exceeding the clamping pressure Pm. Therefore, according to the present invention, it is possible to shorten the molding time, and to miniaturize the pressing machine by suppressing the clamping pressure Pm.

In addition, in the molding device 100 and the molding method that uses the molding device 100 according to the present embodiment, a portion of the resin 220 that is injected in the cavity 15 is suctioned when suctioning the inside of the cavity 15.

According to the molding device 100 configured in this manner and the molding method that uses the molding device 100, since injection space for the resin 220 is secured inside the cavity 15, it becomes easy to inject the resin 220 inside of the cavity 15 without exerting the injection pressure Pi. Therefore, it becomes even easier to shorten the molding time and to suppress the clamping pressure.

Additionally, in the molding device 100 and the molding method according to the present embodiment, the threshold value Pc may be selected from values in the range of 85%-95% of the clamping pressure Pm.

According to a molding device 100 and a molding method that uses the molding device 100 configured in this manner, since the threshold value Pc is set immediately before reaching the clamping pressure Pm, it is possible to inject the resin 220 while exerting an injection pressure Pi that exceeds the clamping pressure Pm, until immediately before the pressure Pr inside the cavity 15 reaches the clamping pressure Pm. Therefore, it becomes possible to further shorten the molding time and to suppress the clamping pressure.

Furthermore, in the molding device 100 and the molding method according to the present embodiment, the pressure inside the cavity 15 when 85%-95% of the total injection amount of the resin 220 has been injected inside of the cavity 15 may be selected as the threshold value Pc.

According to a molding device 100 and a molding method that uses the molding device 100 configured in this manner, by suctioning the inside of the cavity 15 in a state in which a large portion inside of the cavity 15 is filled with the resin 220, flow of the resin 220 is more easily generated inside of the cavity 15. Accordingly, it becomes easy for the resin 220 to spread inside of the cavity 15 without exerting the injection pressure Pi on the resin 220. Therefore, it becomes even easier to shorten the molding time.

Additionally, in the molding device 100 and the molding method according to the present embodiment, the pressure inside the cavity 15 is gradually lowered, when suctioning the inside of the cavity 15.

According to a molding device 100 and a molding method that uses the molding device 100 configured in this manner, it is possible to decrease the mold contraction rate of the composite material 200, which is the molded article, and to stably obtain the shape according to the design. Therefore, it is possible to obtain a high-quality, composite material 200 molded article that has high dimensional stability.

Furthermore, in the molding device 100 and the molding method according to the present embodiment, inside of the mold 10 is in a vacuum state before injecting the resin 220.

According to the molding device 100 configured in this manner and the molding method that uses the molding device 100, it is possible to prevent air bubbles from being generated on the surface and inside the resin 220 after injecting the resin 220, and to reduce voids and pitting in the composite material 200, which is the molded article, by putting the inside of the cavity 15 in a vacuum state before injecting the resin 220. It is thereby possible to improve the mechanical properties and the design of the composite material 200.

In addition, in the molding device 100 and the molding method according to the present embodiment, the reinforcing base material 210 is formed of carbon fibers.

According to the molding device 100 configured in this manner and the molding method that uses the molding device 100, by using carbon fibers in the reinforcing base material, it is possible to mold a composite material 200 that has a small thermal expansion coefficient and is excellent in dimensional stability, and that has little reduction in mechanical properties even under high temperatures.

Additionally, in the molding device 100 and the molding method according to the present embodiment, the composite material 200 is used for automobile parts.

According to the molding device 100 configured in this manner and the molding method that uses the molding device 100, it is possible to mold composite material 200 automobile parts that are suitable for mass production, and to reduce the weight of the vehicle body.

Other Modified Examples

In the embodiments described above, the flow channels 16a, 16b, 17, and the line gate 18 are disposed in the mold 10, as illustrated in FIG. 3 and FIG. 4. They are not limited to this configuration, as there is no limitation as long as the flow channels 16a, 16b, 17, and the line gate 18 are configured such that the resin 220 that is injected by the injection ports 13a and 13b can easily and efficiently spread inside of the cavity.

Figure 10A:
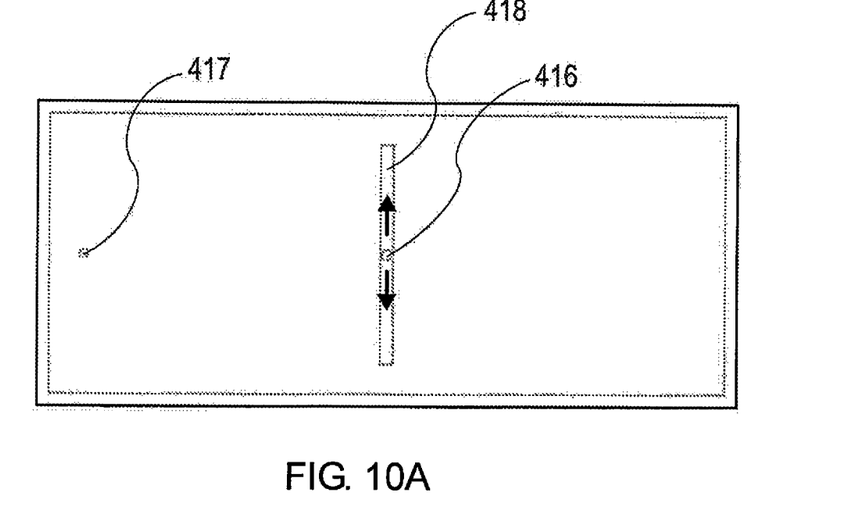
FIG. 10A and FIG. 10B are explanatory diagrams illustrating the line gate of the molding device according to a modified example, and are views, respectively, corresponding to FIG. 5A and FIG. 5B.
Figure 10B:
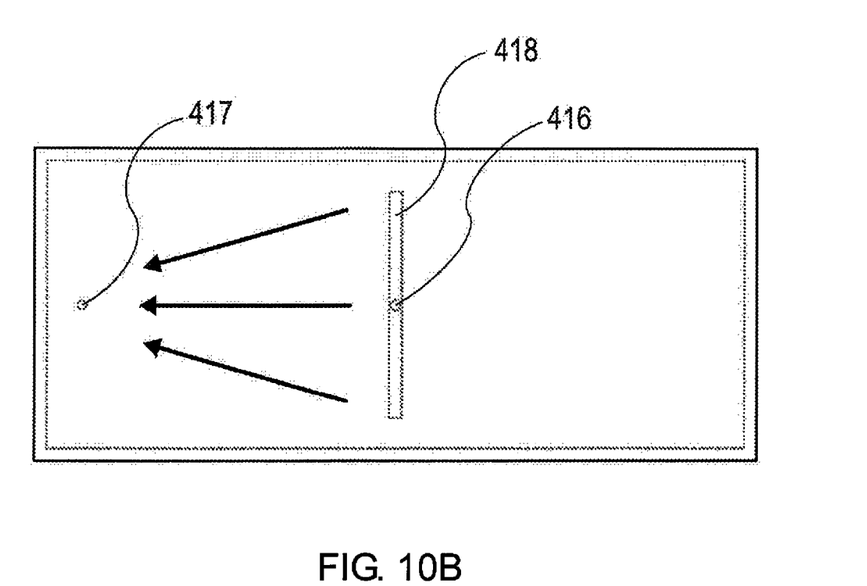

For example, a pair of flow channels 416 and 417, and a line gate 418 may be. disposed as illustrated in FIG. 10A and FIG. 10B. The flow channels 416, 417, and the line gate 418 are each provided in the lower die of the mold, in the same manner as the embodiment described above. In addition, an injection port 413 (not shown) for the resin 220 and a suction opening 414 (not shown) are each fluidly linked to the flow channels 416 and 417 on the lower side of the flow channels 416 and 417. The arrows illustrated in FIG. 10A and FIG. 10B respectively illustrate the flow of the resin 220 when the resin 220 is being injected, and the flow of the resin 220 during suctioning the inside of the cavity.

Figure 11A:
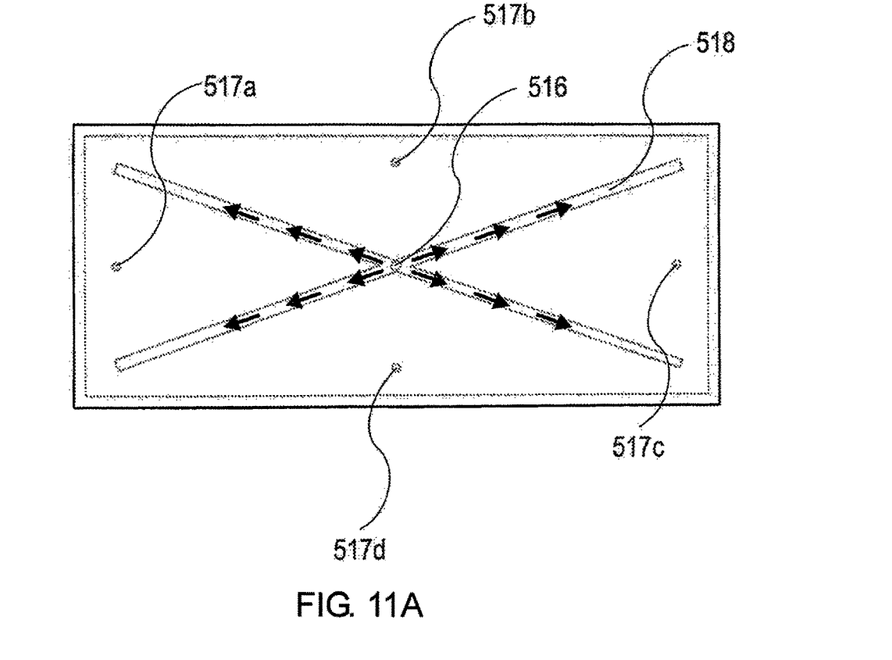
FIG. 11A and FIG. 11B are explanatory diagrams illustrating the line gate of the molding device according to another modified example, and are views, respectively, corresponding to FIG. 5A and FIG. 5B.
Figure 11B:
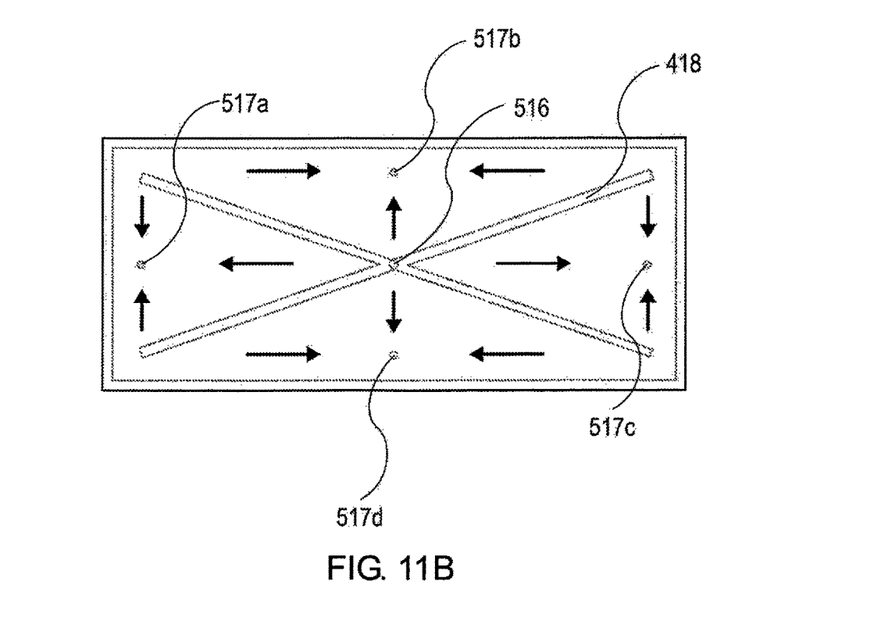

In addition, flow channels 516 and 517a-d, and a line gate 518 may be disposed as illustrated in FIG. 11A and FIG. 11B. The flow channels 516 and 517a-d, and the line gate 518 are each provided in the lower die of the mold in the same manner as the embodiment described above. In addition, an injection port 513 (not shown) for the resin 220 and suction openings 514a-d (not shown) are each fluidly linked to the flow channels 516 and 517a-d on the lower side of the flow channels 516 and 517a-d in a perpendicular direction. The arrows illustrated in FIG. 11A and FIG. 11B, respectively, illustrate the flow of the resin 220 when the resin 220 is being injected, and the flow of the resin 220 during suctioning the inside of the cavity.

As illustrated in FIG. 10 and FIG. 11, by changing the arrangement of the flow channels and the line gate, it is possible to change the flow of the resin 220 when the resin 220 is being injected, and the flow of the resin 220 when suctioning the inside of the cavity. It is thereby possible to adjust the flow of the resin 220 such that the resin 220 is spread efficiently to locations that are difficult for the resin 220 to reach. Furthermore, it is also possible to make an adjustment such that more of the resin 220 is spread to locations in the cavity that is desired to be impregnated by more resin 220. It is thereby possible to efficiently spread the resin 220 inside the cavity, even at a lower injection pressure. Therefore, it becomes possible to further suppress the clamping pressure Pm.

The composite material 200 molding method and molding device 100 were described through embodiments, but the present invention is not limited to the configurations described in the embodiments, and may be appropriately modified based on the descriptions of the claims.

For example, in the above-described embodiments and modified example, the timing of the suction unit 60 suctioning the inside of the cavity 15 was manipulated by the control unit 80 operating the suction valve 63, but no limitation is imposed thereby. For example, a valve that is opened when the pressure inside the cavity 15 reaches the threshold value Pc may be used instead of the suction valve 63. Furthermore, both the injection ports 13a and 13b, and the suction opening 14 were provided in the lower die, but one, or both, may be provided in the upper die as well.

The invention claimed is:

1. A composite material molding method for forming a composite material comprising:
   disposing a reinforcing base material in a cavity inside an openable and closable mold,
   injecting resin into the cavity in a state in which a clamping pressure is exerted on the mold, and
   curing the resin, wherein
   a threshold value of pressure inside the cavity is set to a pressure that is lower than the clamping pressure, and
   when the resin is injected into the cavity, the resin is injected while exerting on the resin an injection pressure that is equal to or greater than the clamping pressure until the pressure inside the cavity reaches the threshold value, and the inside of the cavity is suctioned after the pressure inside the cavity has reached the threshold value.

2. The composite material molding method according to claim 1, wherein
   at least a portion of the resin that is injected into the cavity is suctioned when suctioning the inside of the cavity.

3. The composite material molding method according to claim 1, wherein,
   the pressure inside the cavity is gradually lowered when suctioning the inside of the cavity.

4. The composite material molding method according to claim 1, wherein
   an inside of the mold is in a vacuum state before injecting the resin.

5. The composite material molding method according to claim 1, wherein
   the reinforcing base material is formed from carbon fibers.

6. The composite material molding method according to claim 1, wherein
   the composite material is used for an automobile part.

7. A composite material molding device, comprising:
   an openable and closable mold in which is formed a cavity for disposing a reinforcing base material;
   a pressing part configured to exert a clamping pressure on the mold;
   a resin injection unit configured to inject resin into the cavity; and
   a suction unit configured to apply suction to an inside of the cavity,
   until a pressure inside the cavity reaches a threshold value that is set lower than the clamping pressure, the resin injection unit being configured to inject the resin while exerting an injection pressure on the resin that is equal to or greater than the clamping pressure, and after the pressure inside the cavity has reached the threshold value, the suction unit suctions the inside of the cavity, and the resin injection unit being further configured to inject the resin inside the cavity without exerting the injection pressure on the resin.

8. The composite material molding device according to claim 7, wherein
   the suction unit is configured to apply suction to at least a portion of the resin that is injected into the cavity.

9. The composite material molding device according to claim 7, wherein
   the suction unit is configured to gradually lower the pressure inside the cavity.

10. The composite material molding device according to claim 7, wherein
    the suction unit is configured to create a vacuum state inside of the mold before the resin is injected.

11. The composite material molding device according to claim 7, wherein
    a reinforcing base material is formed from carbon fibers.

12. The composite material molding device according to claim 7, wherein
    the composite material is used for an automobile part.

* * * * *